(12) United States Patent
Lu et al.

(10) Patent No.: US 12,208,668 B2
(45) Date of Patent: Jan. 28, 2025

(54) ELECTRIC VEHICLE

(71) Applicant: Globe (Jiangsu) Co., Ltd., Changzhou (CN)

(72) Inventors: Chuntao Lu, Changzhou (CN); Xinzhong Guo, Changzhou (CN); An Yan, Changzhou (CN); Xi Li, Changzhou (CN)

(73) Assignee: Globe (Jiangsu) Co., Ltd., Changzhou (CN)

( * ) Notice: Subject to any disclaimer, the term of this patent is extended or adjusted under 35 U.S.C. 154(b) by 537 days.

(21) Appl. No.: 17/551,125

(22) Filed: Dec. 14, 2021

(65) Prior Publication Data

US 2022/0203816 A1 Jun. 30, 2022

(30) Foreign Application Priority Data

Dec. 24, 2020 (CN) .......................... 202011550948.6

(51) Int. Cl.
| | | |
|---|---|---|
| *H02J 7/00* | (2006.01) | |
| *A01D 69/02* | (2006.01) | |
| *B60K 1/04* | (2019.01) | |
| *B60L 53/16* | (2019.01) | |
| *B60L 53/22* | (2019.01) | |
| *B60L 53/302* | (2019.01) | |
| *H01M 10/613* | (2014.01) | |

(Continued)

(52) U.S. Cl.
CPC ................ *B60K 1/04* (2013.01); *A01D 69/02* (2013.01); *B60L 53/16* (2019.02); *B60L 53/22* (2019.02); *B60L 53/302* (2019.02); *H01M 10/613* (2015.04); *H01M 10/625* (2015.04); *H01M 10/653* (2015.04); *H01M 10/6563* (2015.04); *H02J 7/0044* (2013.01); *A01D 34/64* (2013.01); *A01D 34/78* (2013.01); *A01D 2101/00* (2013.01); *B60K 2001/0433* (2013.01); *H01M 2220/20* (2013.01); *H02J 2207/20* (2020.01)

(58) Field of Classification Search
CPC ... B60K 1/04; B60K 2001/0433; B60L 53/16; B60L 53/22; B60L 53/302; H01M 10/613; H01M 10/625; H01M 10/653; H01M 10/6563; H01M 2220/20; A01D 34/64; A01D 34/78; A01D 69/02; A01D 2101/00; H02J 7/0044; H02J 2207/20
USPC .................................................. 320/109, 142
See application file for complete search history.

(56) References Cited

U.S. PATENT DOCUMENTS

2015/0060167 A1\* 3/2015 Janarthanam .......... B60K 11/08
180/68.1
2020/0315095 A1 10/2020 Liu et al.

FOREIGN PATENT DOCUMENTS

| CA | 3107893 A1 * | 2/2020 | ........... A01D 34/006 |
|---|---|---|---|
| CN | 203423971 U | 2/2014 | |

(Continued)

*Primary Examiner* — Zixuan Zhou

(57) ABSTRACT

The disclosure provides an electric vehicle. The electric vehicle includes: a vehicle body provided with a power input port and a power supply device. The power supply device includes a charger and a detachable battery pack. The charger includes a power interface for obtaining external power, a charging portion provided with a docking interface, an output part, and a control unit. The output part includes a first power output interface connected with the power input port to supply power to the electric vehicle. When the power interface is connected with the external power, the control unit controls the charging portion to charge the battery pack.

19 Claims, 14 Drawing Sheets

(51) Int. Cl.
*H01M 10/625* (2014.01)
*H01M 10/653* (2014.01)
*H01M 10/6563* (2014.01)
A01D 34/64 (2006.01)
A01D 34/78 (2006.01)
A01D 101/00 (2006.01)

(56) References Cited

FOREIGN PATENT DOCUMENTS

| | | |
|---|---|---|
| CN | 104752653 A | 7/2015 |
| CN | 108819747 A | 11/2018 |
| CN | 111492783 A | 8/2020 |

* cited by examiner

ELECTRIC VEHICLE

CROSS REFERENCE TO RELATED APPLICATION

The present application claims the priority of the following Chinese patent applications: serial No. CN 202011550948.6, filed on Dec. 24, 2020; the disclosure of which is hereby incorporated by reference herein in its entirety for all purposes.

TECHNICAL FIELD

The disclosure relates to an electric vehicle.

BACKGROUND

The riding mower is a mechanical tool for mowing law and vegetation, which can effectively improve the efficiency of mowing and save a lot of manpower. Since the riding mower can be ridden by the operator, it is convenient for the operator to work on a larger grassland. However, the battery pack and the vehicle body of the existing riding mower are usually arranged as a whole, which makes the battery pack of the riding mower useless except for powering the riding mower. Secondly, when the user is working outdoors, sometimes it is necessary to use other power tools besides the mower. At this time, the user has to carry an extra battery pack that matches the power tool, which brings inconvenience to the user.

In view of the above problems, it is necessary to provide a new electric vehicle to solve the above problems.

SUMMARY

The disclosure provides an electric vehicle, the electric vehicle is provided with a detachable power supply device, which is convenient for users to remove the power supply device for charging, or use the power supply device as an emergency power supply. At the same time, because the battery pack can be detachably inserted into the charger, the battery pack can also be used as a power source of other power tools, or a battery pack of other power tools can be inserted into the charger to serve as a power source of the electric vehicle.

The disclosure provides an electric vehicle, the electric vehicle includes a vehicle body provided with a power input port, and a power supply device detachably mounted on the vehicle body. The power supply device supplies power for the electric vehicle and includes a charger and a battery pack that can be detachably inserted into the charger. The charger includes a power interface used to obtain external power, a charging portion provided with a docking interface to connect with the battery pack, an output part used to output power to the outside, and a control unit. The output part includes a first power output interface connected with the power input port to supply power to the electric vehicle. When the power interface is connected with external power, the control unit controls the charging portion to charge the battery pack.

As a further improvement of the disclosure, the charger is also provided with an inverter unit, the output part further includes a second power output interface, and the inverter unit is used to invert the power obtained by the docking interface from the battery pack into alternating current, and output the alternating current through the second power output interface.

As a further improvement of the disclosure, the battery pack is detachably connected to a power tool.

As a further improvement of the disclosure, the vehicle body is provided with a charging port to obtain external power and a power output port electrically connected with the charging port, and when the power supply device is installed on the vehicle body, the power output port is connected with the power interface, at this time, the charger obtains external power through the charging port of the vehicle body and charges the battery pack.

As a further improvement of the disclosure, the power interface includes a first power interface matched with the power output port and a second power interface to connect with an external power source, the first power interface is arranged on a bottom wall of the charger, and the second power interface is arranged on a side wall of the charger.

As a further improvement of the disclosure, the charger also includes a base to house the inverter unit and the control unit.

As a further improvement of the disclosure, the base is located on one side of the charging portion and perpendicular to the charging portion, the charger is also provided with a ventilation fan housed in the base and a ventilation hole arranged on a side wall of the base and matched with the ventilation fan, and the ventilation fan is located at an end of the base away from the charging portion.

As a further improvement of the disclosure, the base is located on one side of the charging portion and perpendicular to the charging portion, the number of the charging portion is 1, the electric vehicle includes one or more power supply devices, the one or more power supply devices are arranged along a forward direction of the electric vehicle; and in a direction perpendicular to the forward direction of the electric vehicle, the number of the power supply devices is not more than two.

As a further improvement of the disclosure, the charger further includes a supporting part mounted on the base, the base is provided with one or more charging portions, and the charging portions are arranged around the supporting part, and the inverter unit and the control unit are housed in the base.

As a further improvement of the disclosure, the support part is provided with a first heat dissipation unit to dissipate heat for the battery pack inserted into the charger.

As a further improvement of the disclosure, the supporting part includes a first wall facing the battery pack and a second wall located between adjacent charging portions, the first wall is provided with a first vent, and the second wall is provided with a second vent corresponding to the first vent, and the first heat dissipation unit drives airflow to flow into one of the first vent and the second vent, and flow out from the other one of the first vent and the second vent.

As a further improvement of the disclosure, a second heat dissipation unit to dissipate heat for the inverter unit and the control unit is provided in the base, the base is also provided with an air inlet and an air outlet corresponding to the air inlet, and the second heat dissipation unit drives the airflow to flow into the air inlet and out from the air outlet, so as to dissipate heat for the inverter unit and the control unit.

As a further improvement of the disclosure, the base is also provided with heat sinks for auxiliary heat dissipation for the inverter unit and the control unit, and an airflow direction of the air inlet and the air outlet is parallel to the heat sinks.

As a further improvement of the disclosure, the number of the charging portions is two, the two charging portions are respectively located on both sides of the supporting part to allow the two charging portions and the supporting parts to be collinear in a first direction, the electric vehicle includes one or more power supply devices, the one or more power supply devices are arranged along a forward direction of the electric vehicle, wherein, the first direction is parallel to the forward direction of the electric vehicle; and in a direction perpendicular to the forward direction of the electric vehicle, the number of the power supply devices is not more than two.

As a further improvement of the disclosure, the number of the charging portions is two, the two charging portions are respectively located on both sides of the supporting part to allow the two charging portions and the supporting parts to be collinear in a first direction, the electric vehicle includes one or more power supply devices, the one or more power supply devices are arranged along a forward direction of the electric vehicle, wherein, the first direction is perpendicular to the forward direction of the electric vehicle, and, in the first direction, the number of the power supply device is one.

As a further improvement of the disclosure, the charger also includes a base, the base is provided with one or more charging portions and a ventilation fan, and the ventilation fan drives airflow to dissipate heat for the charger.

As a further improvement of the disclosure, the base is also provided with an air-duct, the air-duct is arranged along a forward direction of the electric vehicle, the one or more charging portions are arranged on both sides of the air-duct, and the ventilation fan is located in the air-duct and drives the airflow to flow into one end of the air-duct and flow out from the other end.

As a further improvement of the disclosure, the control unit obtains information of power of the battery pack, determines a discharge priority level of each battery pack according to level of the power, and then controls the battery pack with a highest discharge priority level to discharge, and when power difference between a current working battery pack and a battery pack of a next discharge priority level is within a first preset threshold, the control unit controls the battery pack of the next discharge priority level to discharge together with the current working battery pack.

As a further improvement of the disclosure, the electric vehicle includes a walking mechanism, the walking mechanism includes front wheels and rear wheels, and a center/center of gravity of the power supply device or a power supply device group including several power supply devices is located between the front wheels and the rear wheels, and a distance between the center/center of gravity and an axis of the rear wheels is less than 490 mm.

As a further improvement of the disclosure, the electric vehicle includes a walking mechanism, and the walking mechanism includes a pair of rear wheels, in a forward direction of the electric vehicle, the pair of rear wheels are symmetrical about a first axis, and a horizontal distance between a center/center of gravity of the power supply device or a power supply device group including several power supply devices and the first axis is not greater than 500 mm.

As a further improvement of the disclosure, a weight ratio of the power supply device or the power supply device group including a plurality of the power supply devices to the electric vehicle without the power supply device or without the power supply device group is not greater than 0.5.

As a further improvement of the disclosure, the weight ratio of the power supply device or the power supply device group including the plurality of the power supply devices to the electric vehicle without the power supply device or without the power supply device group is not more than ⅓.

As a further improvement of the disclosure, the electric vehicle further includes a walking mechanism, the walking mechanism includes front wheels and rear wheels, and a distance between a center of gravity of the electric vehicle provided with the power supply device and an axis of the rear wheels is not greater than 500 mm.

The beneficial effects of the disclosure are: because the power supply device of the electric vehicle of the disclosure is detachable, it is convenient for the user to remove the power supply device for charging, or use the power supply device as an emergency power supply. At the same time, because the battery pack can be detachably inserted into the charger, the battery pack can also be used as a power source of other power tools, or a battery pack of other power tools can be inserted into the charger to become the power source of the electric vehicle.

DETAILED DESCRIPTION

In order to make the purpose, technical solutions and advantages of the disclosure clearer, the disclosure will be described in detail below with reference to the accompanying drawings and specific embodiments.

Figure 1:
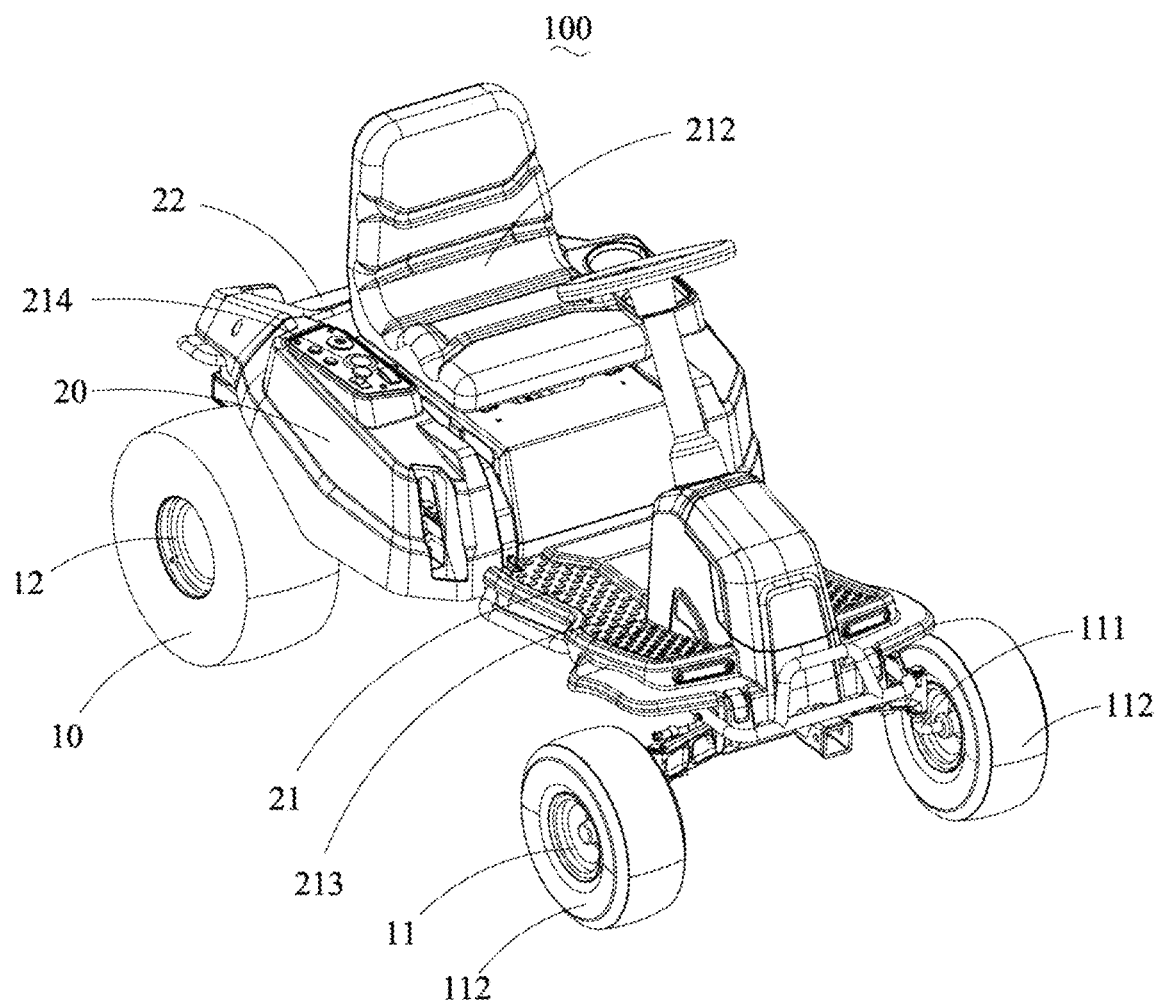
FIG. 1 is a perspective schematic view of an electric vehicle according to a first embodiment of the disclosure.
Figure 2:
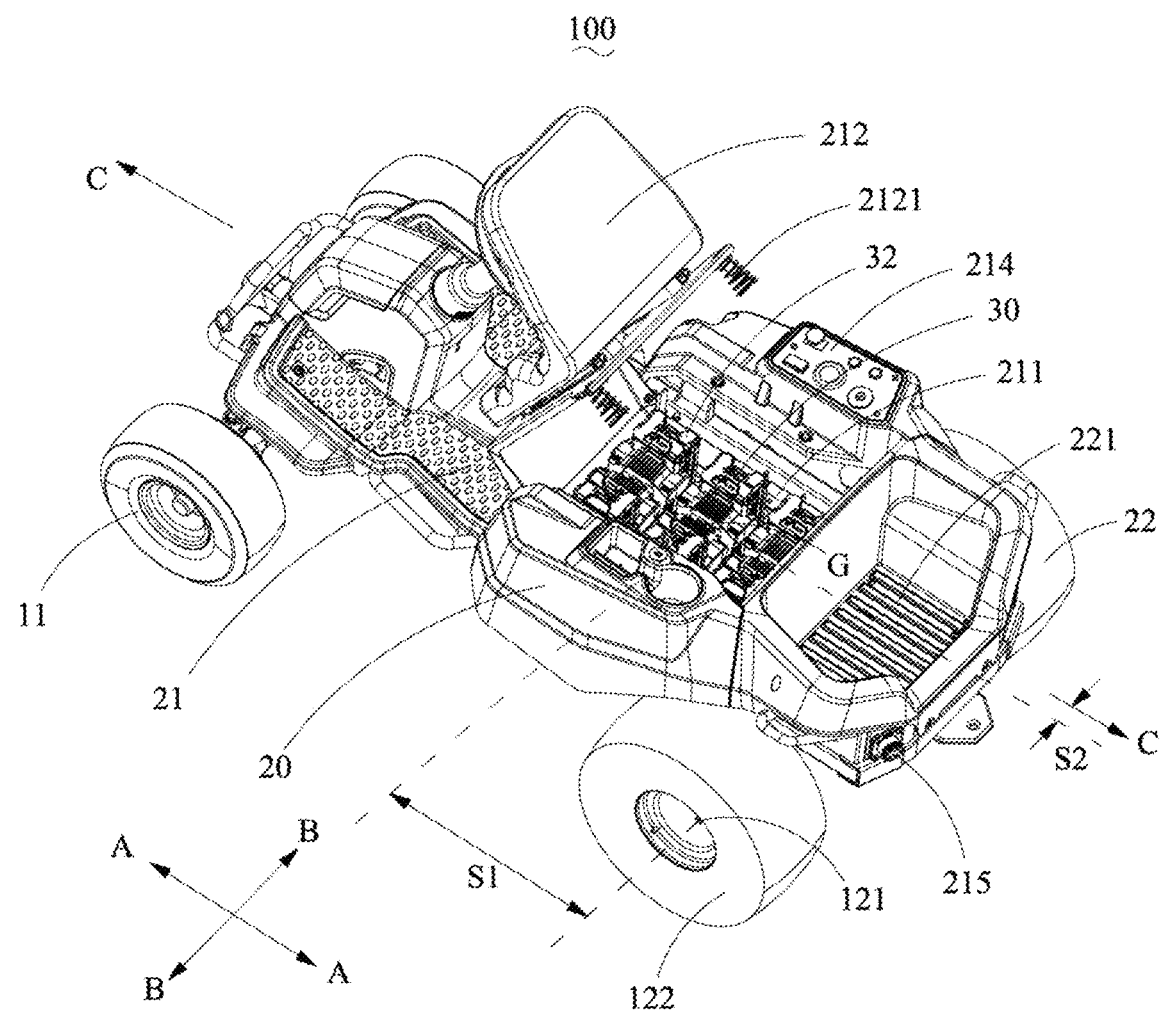
FIG. 2 is a perspective schematic view of the electric vehicle shown in FIG. 1 in another state.
Figure 3:
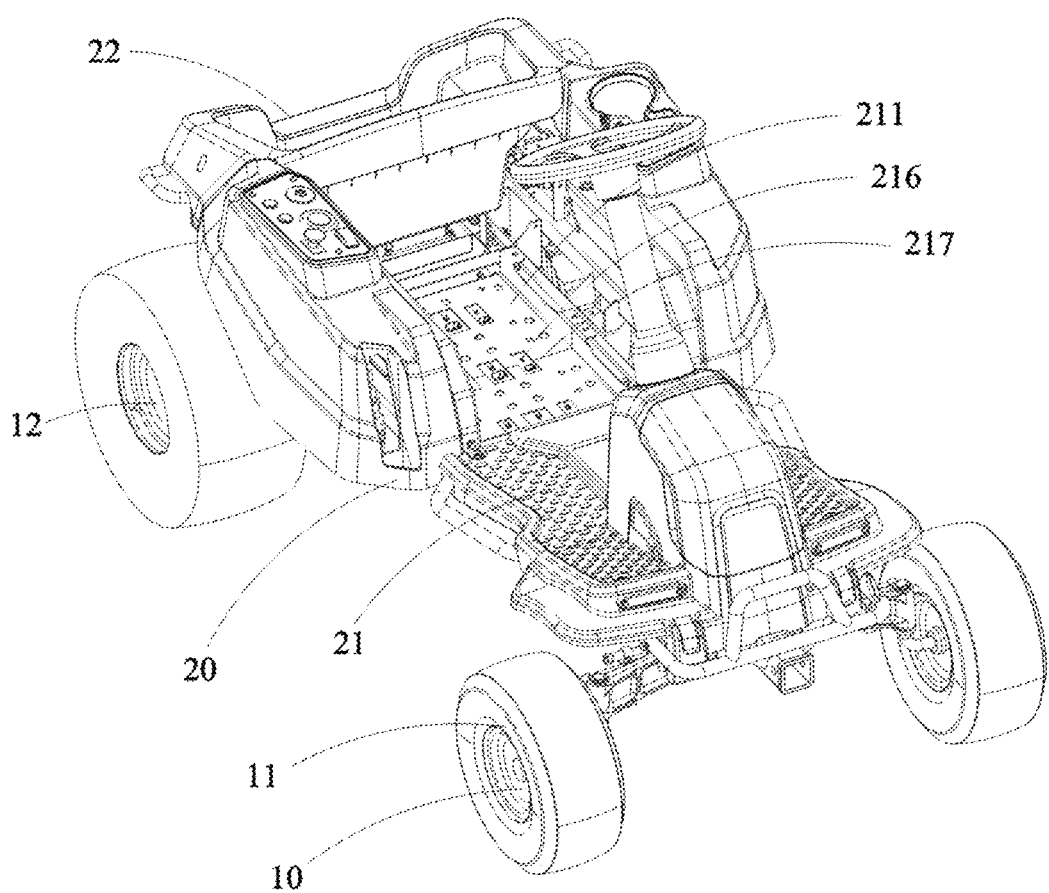
FIG. 3 is a perspective schematic view of the electric vehicle shown in FIG. 1 without a seat and power supply device.
Figure 4:
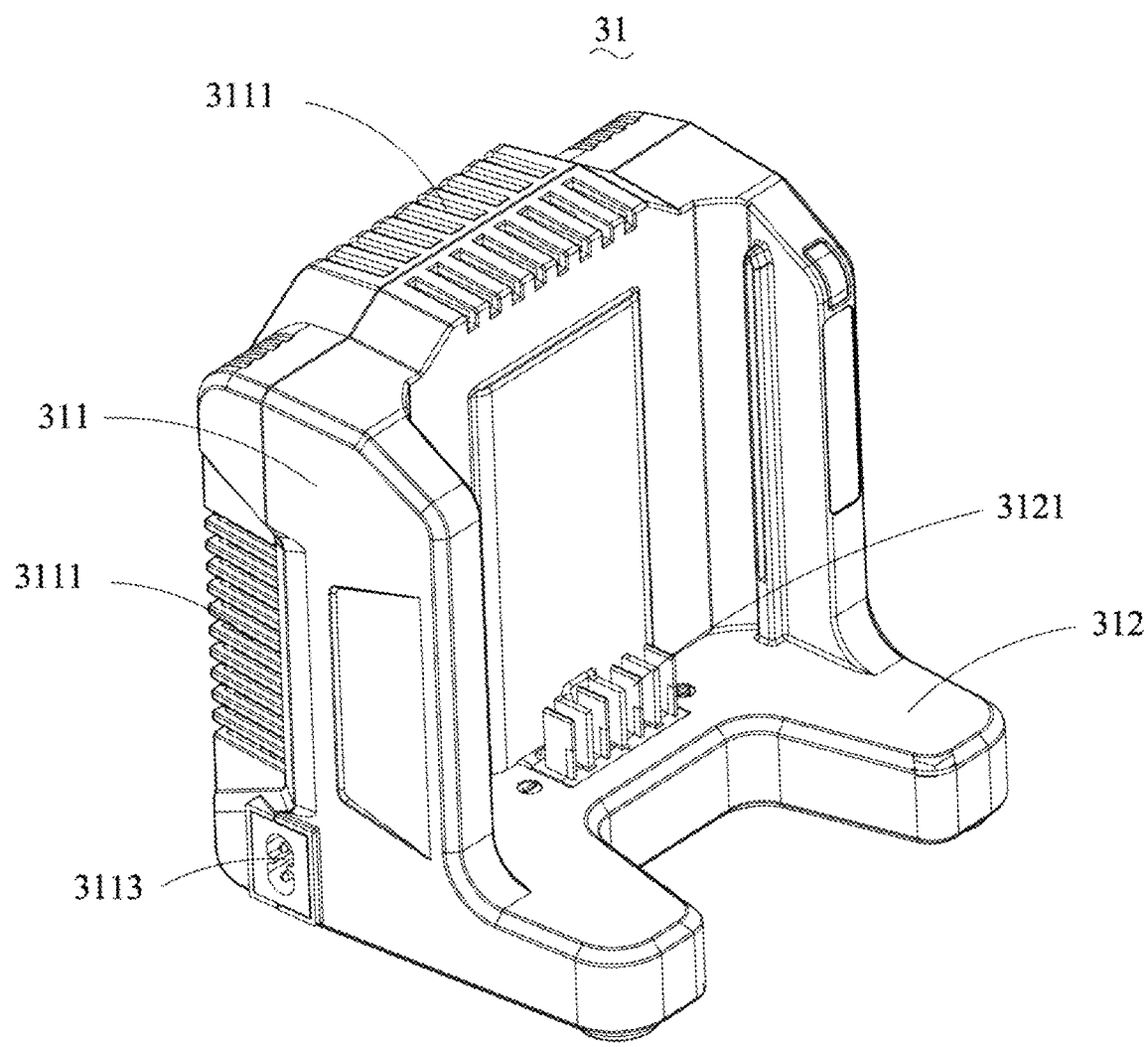
FIG. 4 is a perspective schematic view of a charger of the first embodiment.
Figure 5:
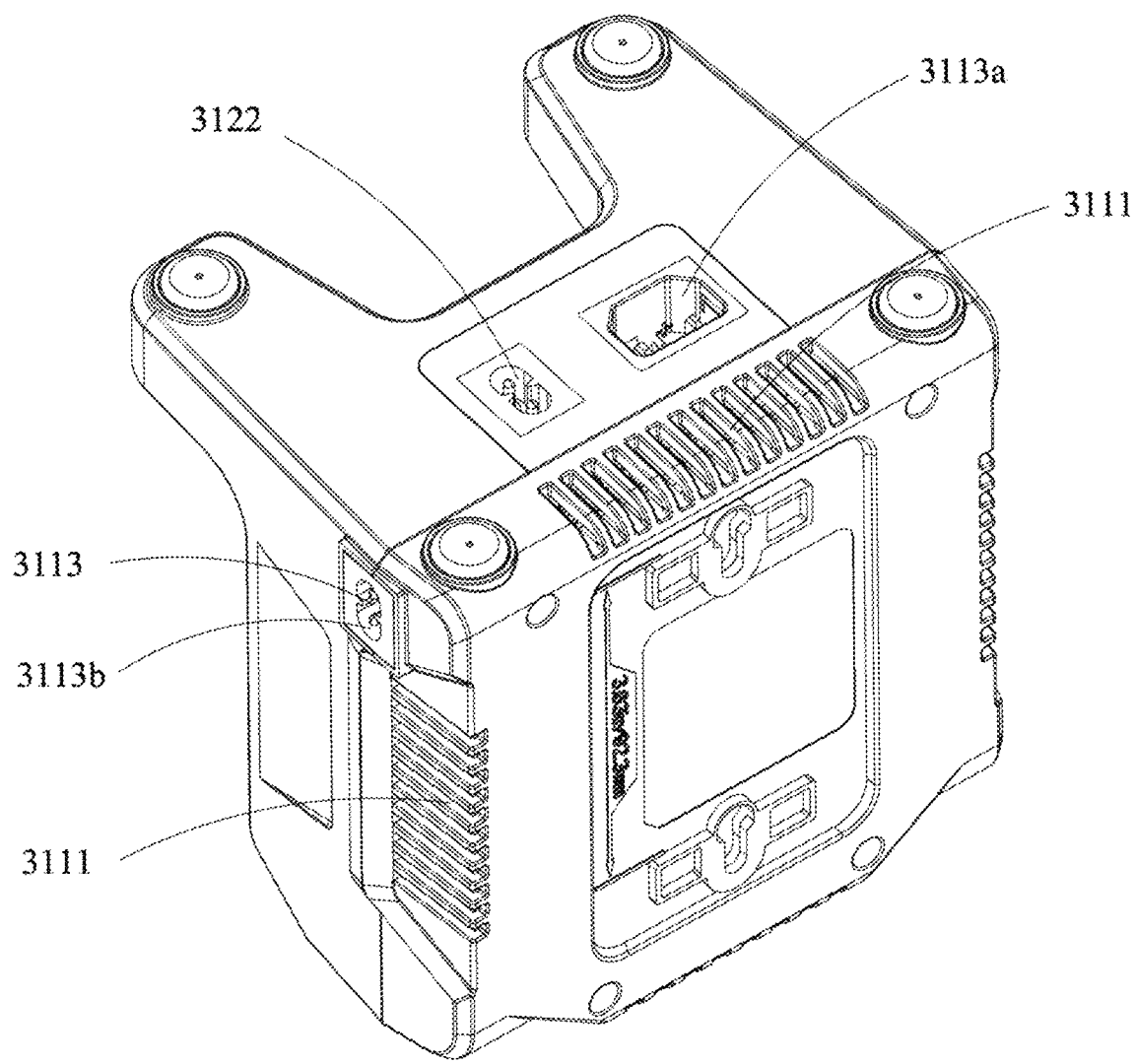
FIG. 5 is a perspective schematic view of the charger shown in FIG. 4 from another angle.
Figure 6:
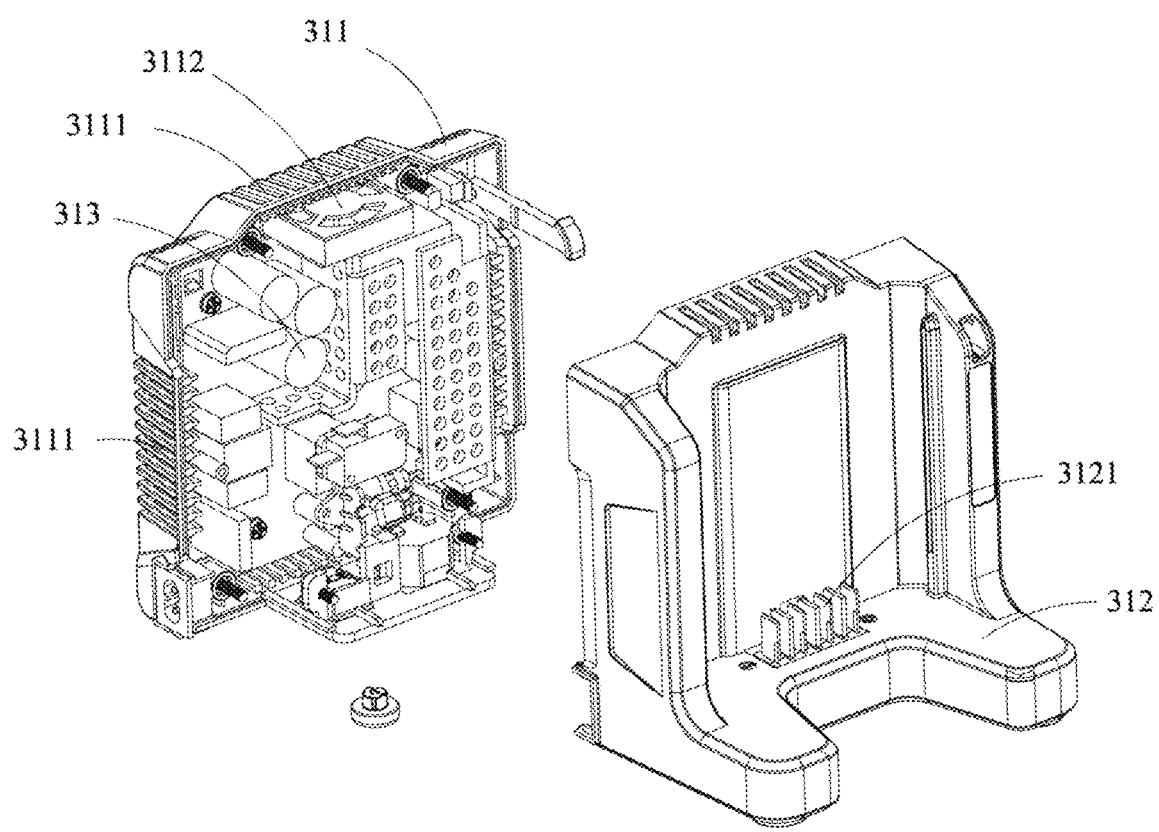
FIG. 6 is an exploded perspective view of the charger shown in FIG. 4.

Please refer to FIG. 1, FIG. 2 and FIG. 3. The disclosure provides an electric vehicle 100, the electric vehicle 100 can be an electric mower, a golf cart, an all-terrain vehicle, and so on. The electric vehicle 100 includes a walking mechanism 10, a vehicle body 20 mounted on the walking mechanism 10, a work apparatus (not shown) mounted on the vehicle body 20 to perform working functions, a driving mechanism (not shown) for driving the walking mechanism 10 and the work apparatus to work, and a power supply device 30 that provides energy for the driving mechanism.

Please refer to FIG. 1 and FIG. 2, the walking mechanism 10 includes a front wheel assembly 11 and a rear wheel assembly 12 arranged opposite to the front wheel assembly 11. The front wheel assembly 11 includes a front axle 111 and a pair of front wheels 112 mounted at both ends of the front axle 111. The rear wheel assembly 12 includes a rear axle 121 parallel to the front axle 111 and a pair of rear wheels 122 mounted at both ends of the rear axle 121. The front axle 111 and the rear axle 121 jointly form an axial plane.

Please refer to FIG. 1, FIG. 2 and FIG. 3, the vehicle body 20 is mounted on the walking mechanism 10, and includes a base 21 located between the front axle 111 and the rear axle 121 and a tail 22 which is on a side of the rear axle 121 away from the front axle 111. The base 21 is provided with a receiving cavity 211, a seat 212, pedals 213, an operating assembly 214, and a power input port 216. The receiving cavity 211 is located on a side of the base 21 close to the tail 22 for receiving the power supply device 30. The seat 212 is pivotally mounted on one side of the receiving cavity 211 through a pivot (not shown). A shock-absorbing component 2121 is provided on a side of the seat 212 away from the pivot, so as to prevent vibrations generated during a movement of the electric vehicle 100 from causing discomfort to the user. In this embodiment, the shock-absorbing component 2121 is a spring. Of course, the shock-absorbing component 2121 may also be other forms of parts, which is not limited in the disclosure. When the seat 212 is in a first state (as shown in FIG. 1), the seat 212 is located above the receiving cavity 211 and can serve as a cover for the receiving cavity 211 to prevent the power supply device 30 located in the receiving cavity 211 from being exposed to the outside, so that the power supply device 30 can be protected. When the seat 212 is rotated and then is transformed from the first state to a second state (as shown in FIG. 2), the seat 212 is located on a side of the receiving cavity 211 away from the tail 22. At this time, the receiving cavity 211 is exposed to the outside to facilitate the user to put in or take out the power supply device 30. The pedals 213 are located on a side of the receiving cavity 211 away from the tail 22 for the user to step on. When the seat 212 is in the second state, the seat 212 is located above the pedal 213. The operating assembly 214 is arranged on one side or both sides of the seat 212 for the user to operate. The operating assembly 214 usually includes a brake, a speed control key, an on-off key, etc., which belong to the prior art, and the disclosure will not elaborate on this in detail. The power input port 216 is arranged in the receiving cavity 211 to match with the power supply device 30 and obtain power from the power supply device 30, so that the power input port 216 can provide power for the driving mechanism. The tail 22 is provided with a receiving space 221 for receiving various parts, tools and so on. The work apparatus is used to perform working functions. The work apparatus may be a cutter assembly mounted on a side of the base 21 facing the ground, or a snow pushing assembly mounted at a front end of the base 21 or the like. The disclosure does not limit the specific functions realized by the work apparatus. The driving mechanism is used to drive the walking mechanism 10 and the work apparatus to work, and usually includes a first motor (not shown) that drives the walking mechanism 10 to work and a second motor (not shown) that drives the work apparatus to work (not shown).

Please refer to FIG. 2, FIG. 3, FIG. 5 and FIG. 6, the power supply device 30 is detachably installed in the receiving cavity 211 and matches with the power input port 216 to supply power to the electric vehicle 100. The power supply device 30 includes a charger 31 and a battery pack 32 matched with the charger 31. The charger 31 includes a base 311, a charging portion 312 and a circuit board. The circuit board integrates an inverter unit and a control unit 313. The base 311 is located at one side of the charging portion 312 and perpendicular to the charging portion 312. The base 311 is provided with several ventilation holes 3111, a ventilation fan 3112 matched with the ventilation holes 3111 and a power interface 3113. The ventilation hole 3111 is arranged on a side wall of the base 311, and the ventilation fan 3112 is arranged in the base 311. When the ventilation fan 3112 works, the ventilation fan 3112 drives the air to flow into the base 311 from part of the ventilation holes 3111, flow through the circuit board, and then flow out from the remaining ventilation holes 3111, so that heat dissipation of the electronic components on the circuit board can be realized. The power interface 3113 is arranged on a side wall of the base 311 to obtain external power. The charging portion 312 is used to carry the battery pack 32, and is provided with a docking interface 3121 and an output part. The docking interface 3121 is used to connect with the battery pack 32 to obtain the power in the battery pack 32 or to charge the battery pack 32. The output part is arranged at a bottom of the charging portion 312 to output power to the outside. The output part includes a first power output interface 3122 and a second power output interface (not shown). The first power output interface 3122 is used to connect with the power input port 216 to supply power to the electric vehicle 100. The inverter unit and the control unit 313 are housed in the base 311. The inverter unit is used to invert the power obtained by the docking interface 3121 from the battery pack 32 into alternating current, and output the alternating current through the second power output interface. As another embodiment, the charging portion 312 can also be provided with a direct current output interface (not shown) to output direct current. The direct current output interface includes one or more of a USB 2.0 interface, a USB 3.0 interface, a Micro USB interface, and a Type-C interface. An output voltage of the direct current output interface can be 5V, 20V, etc., which is not limited in the disclosure.

When the power interface 3113 is connected to external power, the control unit 313 controls the charging portion 312 to charge the battery pack 32. When the power supply device 30 supplies power to the electric vehicle 100, the docking interface 3121 obtains power from the battery pack 32 and supply power to the electric vehicle 100 through the matching between the first power output interface 3122 and the power input port 216. When other power tools need to use the battery pack, the battery pack 32 can be removed from the charger 31, and the battery pack 32 can be inserted into the power tool to be used. With this arrangement, the electric vehicle 100 of the disclosure can share the battery pack 32 with other power tools, which increases the usage rate of the battery pack 32 and reduces the user's cost and the maintenance cost of the battery pack.

Preferably, the vehicle body 20 is further provided with a charging port 215 for obtaining external power and a power output port 217 electrically connected with the charging port 215. The charging port 215 is arranged on a side of the tail 22 away from the base 21. Of course, it is understandable that the charging port 215 can also be arranged in other positions of the vehicle body 20. The disclosure does not limit the location of the charging port 215. The power output port 217 is arranged in the receiving cavity 211. The power interface 3113 includes a first power interface 3113*a* and a second power interface 3113*b*. The first power interface 3113*a* is provided at a bottom of the charging portion 312 to be connected with the power output port 217 so as to obtain external power through the charging port 215 of the vehicle body 20. The second power interface 3113*b* is arranged on a side wall of the base 311. When the power supply device 30 is mounted in the receiving cavity 211, the power output port 217 is directly connected with the first power interface 3113*a*. Due to the gravity of the power supply device 30, the connection between the first power interface 3113*a* and the power output port 217 is relatively firm.

In this embodiment, the number of the charging unit 312 of the power supply device 30 is one. Please refer to FIG. 2, the electric vehicle 100 is usually provided with one or more power supply devices 30. Preferably, the one or more power supply devices 30 are arranged along a forward direction of AA of the electric vehicle 100. And in a direction BB perpendicular to the forward direction of the electric vehicle 100, the number of the power supply devices 30 is not more than two. This arrangement can effectively shorten a width of the electric vehicle 100 in the direction BB.

Preferably, please refer to FIG. 2, a center/center of gravity G of the power supply device 30 or a power supply device group including several power supply devices 30 is located between the front axle 111 and the rear axle 121, and a distance S1 between the center/center of gravity G and the rear axle of the rear wheels 122 in direction AA is less than 490 mm. This arrangement makes the electric vehicle 100 difficult to roll over. In the forward direction of the electric vehicle 100 mentioned above, the pair of rear wheels 122 are symmetrical about a first axis CC. A distance S2 between the center/center of gravity G of the power supply device 30 or the power supply device group including several power supply devices 30 and the first axis BB is not greater than 500 mm. This arrangement makes the electric vehicle 100 difficult to roll over from the side. Further, a weight ratio of the power supply device 30 or the power supply device group including several power supply devices 30 to the electric vehicle 100 without the power supply device 30 or without the power supply device group is not greater than 0.5. Preferably, the weight ratio of the power supply device 30 or the power supply device group including several power supply devices 30 to the electric vehicle 100 without the power supply device 30 or without the power supply device group is not more than ⅓. Further, a distance between a center of gravity of the electric vehicle 100 on which the power supply device 30 is mounted and an axis of the rear wheel 122 in direction AA is not greater than 500 mm.

The power supply device 30 of the electric vehicle 100 of the disclosure is detachable, it is convenient for users to remove the power supply device 30 for charging the power supply device 30, or use the power supply device 30 as an emergency power source. At the same time, since the battery pack 32 is detachably inserted into the charger 31, the battery pack 32 can also be used as a power source for other power tools, or a battery pack of other power tools can be inserted into the charger 31 to become the power source of the electric vehicle 100. Secondly, the power supply device 30 of the electric vehicle 100 of the disclosure can also provide alternating current for emergency use, which meets the user's demand for alternating current outdoors.

Figure 7:
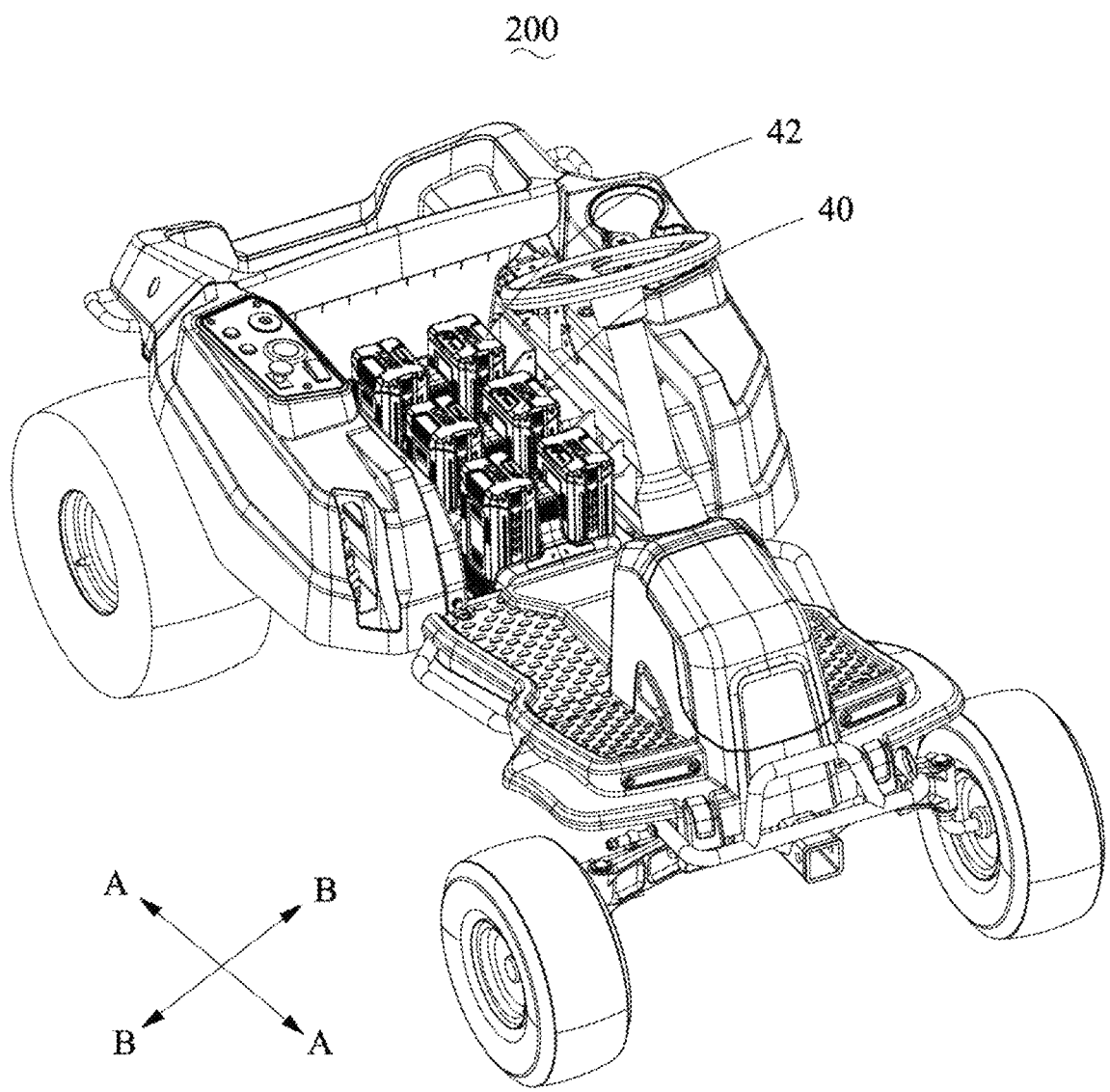
FIG. 7 is a perspective schematic view of an electric vehicle according to a second embodiment of the disclosure.

FIG. 7 shows an electric vehicle 200 according to a second embodiment of the disclosure. The structure of the electric vehicle 200 is basically the same as the structure of the electric vehicle 100, the electric vehicle 200 includes the walking mechanism 10, the vehicle body 20, the work apparatus, and the driving mechanism. The difference between the electric vehicle 200 and the electric vehicle 100 is that a power supply device 40 of the electric vehicle 200 is different from the power supply device 30 of the electric vehicle 100. Please refer to FIG. 8, FIG. 9, FIG. 10 and FIG. 7, the power supply device 40 is detachably mounted in the receiving cavity 211 and matches with the power input port 216 to supply power to the electric vehicle 200. The power supply device 40 includes a charger 41 and a battery pack 42 matched with the charger 41. The charger 41 includes a base 411, a supporting part 412 mounted on the base 411, and a control circuit board. The control circuit board integrates an inverter unit (not shown) and a control unit (not shown). The base 411 is provided with a power interface 4111, one or more charging portions 4112, and an output part. The power interface 4111 is located on a side wall of the base 411 for obtaining external power. The charging portion 4112 is arranged on a top of the base 411 and partly around the supporting part 412. The charging portion 4112 is provided with a docking interface 4112*a* connected with the battery pack 42 to obtain power of the battery pack 42 or to charge the battery pack 42. In this embodiment, the number of the charging portions 4112 is two, and the two charging portions 4112 are located on both sides of the supporting part 412, so that the two charging portions 4112 and the supporting part 412 are collinear in a first direction DD. The output part is arranged at a bottom of the base 411 and includes a first power output interface 4113 and a second power output interface (not shown). The first power output interface 4113 is used to connect with the power input port 216 to supply power to the electric vehicle 200. In this embodiment, the output part is arranged at the bottom of the base 411, but in other embodiments, the output part can also be arranged at other positions. For example: a side wall, top wall and so on of the base 411. The inverter unit and the control unit are housed in the base 411. The inverter unit is used for inverting the power obtained by the docking interface 4112*a* from the battery pack 42 into alternating current, and outputting the alternating current through the second power output interface. As another embodiment, the output part may also be provided with a direct current output interface (not shown) to output direct current power. The direct current output interface includes one or more of a USB 2.0 interface, a USB 3.0 interface, a Micro USB interface, and a Type-C interface. An output voltage of the direct current output interface can be 5V, 20V, etc., which is not limited in the disclosure. Preferably, the base 411 is further provided with a second heat dissipation unit 4114 for dissipating heat for the control circuit board. The side wall of the base 411 is further provided with an air inlet 4115 and an air outlet 4116 corresponding to the air inlet 4115. The second heat dissipation unit 4114 drives the airflow to flow into the air inlet 4115 and out from the air outlet 4116, so as to dissipate heat of the control circuit board located in the base 411. Preferably, heat sinks (not shown) for auxiliary heat dissipation of the control circuit board is provided in the base 411. Airflow directions of the air inlet 4115 and the air outlet 4116 are parallel to the heat sinks.

Preferably, the power interface 4111 includes a first power interface 4111*a* and a second power interface 4111*b*. The first power interface 4111*a* is provided at the bottom of the base 411 to connect with the power output port 217 so as to obtain external power through the charging port 215 of the vehicle body 20. The second power interface 4111*b* is arranged on the side wall of the base 411. When the power supply device 40 is mounted in the receiving cavity 211, the power output port 217 of the vehicle body 20 is directly connected with the first power port 4111*a*. When the user takes the power supply device 40 out of the receiving cavity 211, the user can supply power to the charger 41 through the second power interface 4111*b*.

Figure 8:
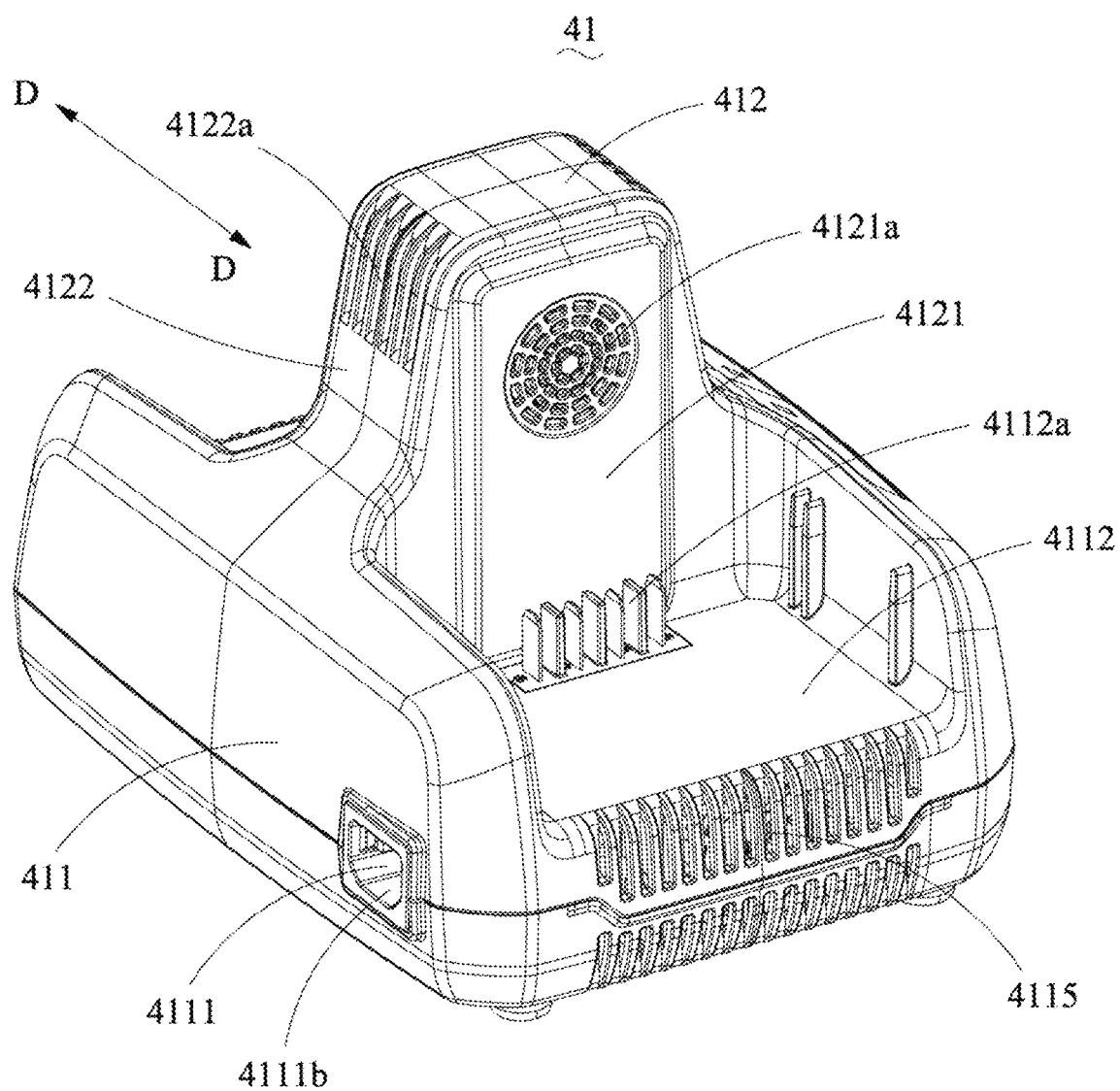
FIG. 8 is a perspective schematic view of a charger of the second embodiment.
Figure 9:
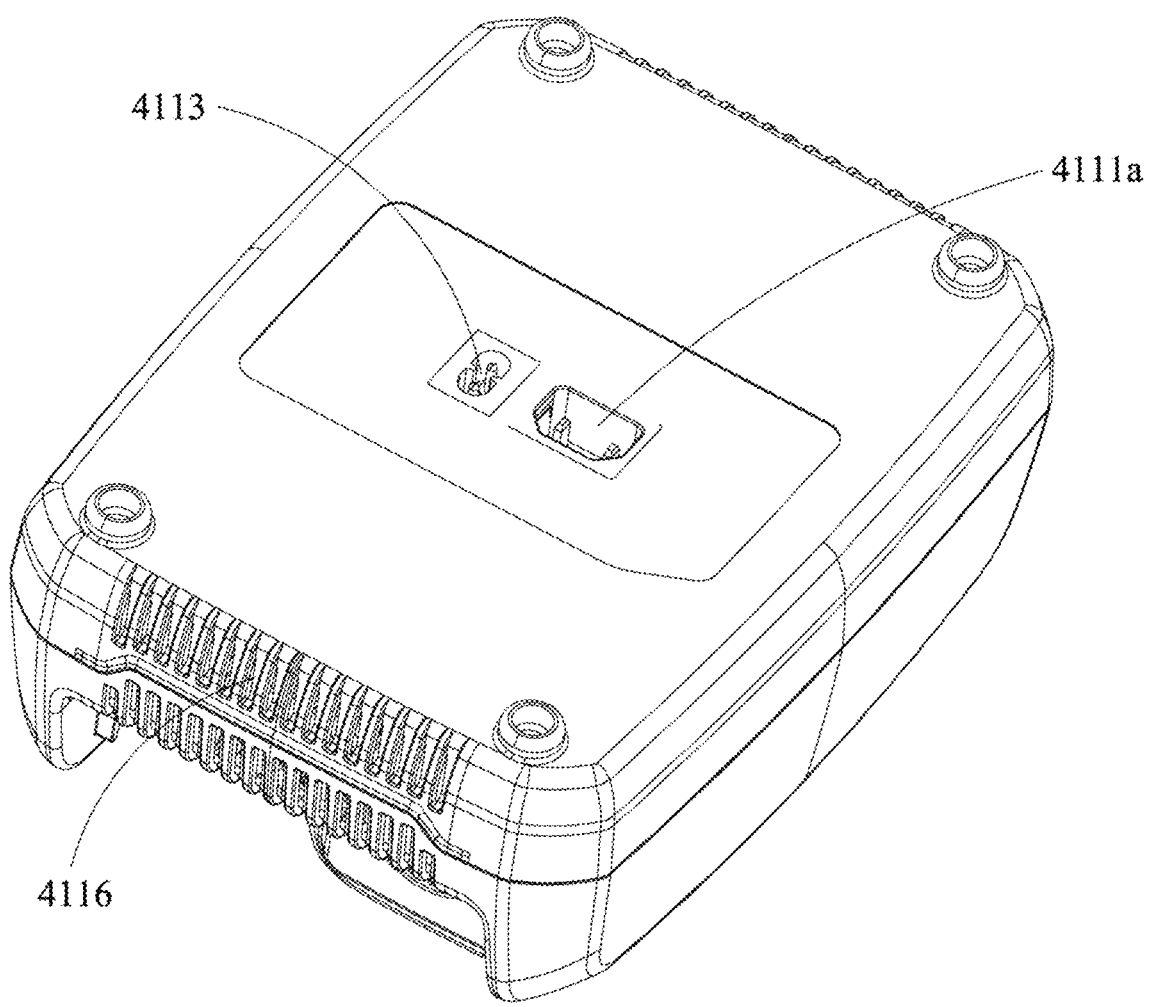
FIG. 9 is a perspective schematic view of the charger shown in FIG. 8 from another angle.
Figure 10:
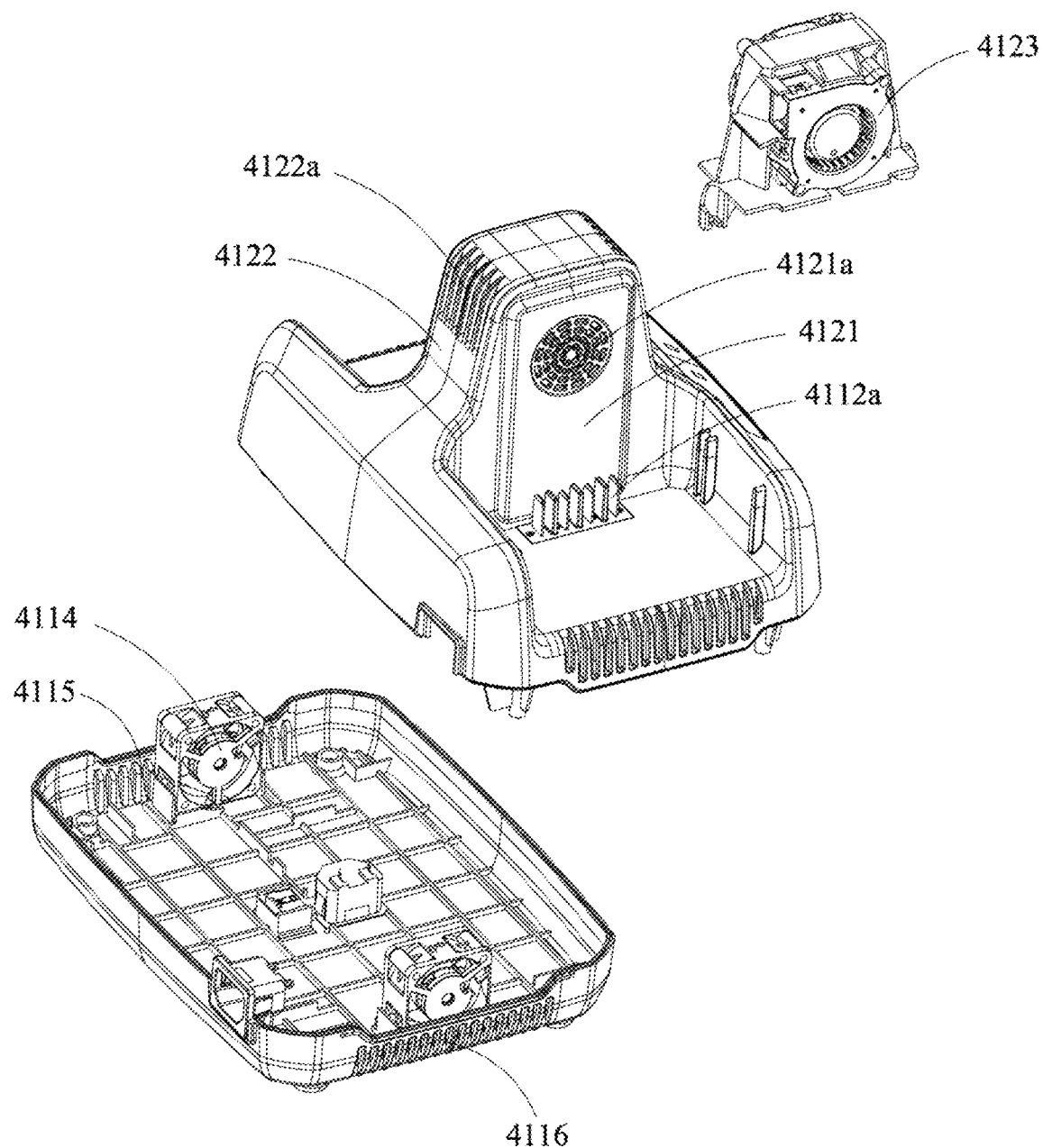
FIG. 10 is an exploded perspective view of the charger shown in FIG. 8.

Please refer to FIG. 8 and FIG. 10, the supporting part 412 includes a first wall 4121 facing the battery pack 42, a second wall 4122 located between adjacent charging portions 4112, and a first heat dissipation unit 4123 for heat dissipation of the battery pack 42. The first wall 4121 is provided with a first vent 4121a, and the second wall 4122 is provided with a second vent 4122a corresponding to the first vent 4121a. The first heat dissipation unit 4123 is mounted in the support part 412, and drives air to flow into one of the first vent 4121a and the second vent 4122a and out from the other one for heat dissipation of the battery pack 42.

Please refer to FIG. 7, the electric vehicle 200 is usually provided with one or more power supply devices 40. Preferably, the one or more power supply devices 40 are arranged along the forward direction AA of the electric vehicle 200. When the first direction DD of the charger 41 is parallel to the forward direction AA of the electric vehicle 200, the number of the power supply devices 40 is not more than two in the direction BB perpendicular to the forward direction of the electric vehicle 200. When the first direction DD of the charger 41 is perpendicular to the forward direction AA of the electric vehicle 200, the number of the power supply devices 40 is one in the direction BB perpendicular to the forward direction of the electric vehicle 200.

Figure 11:
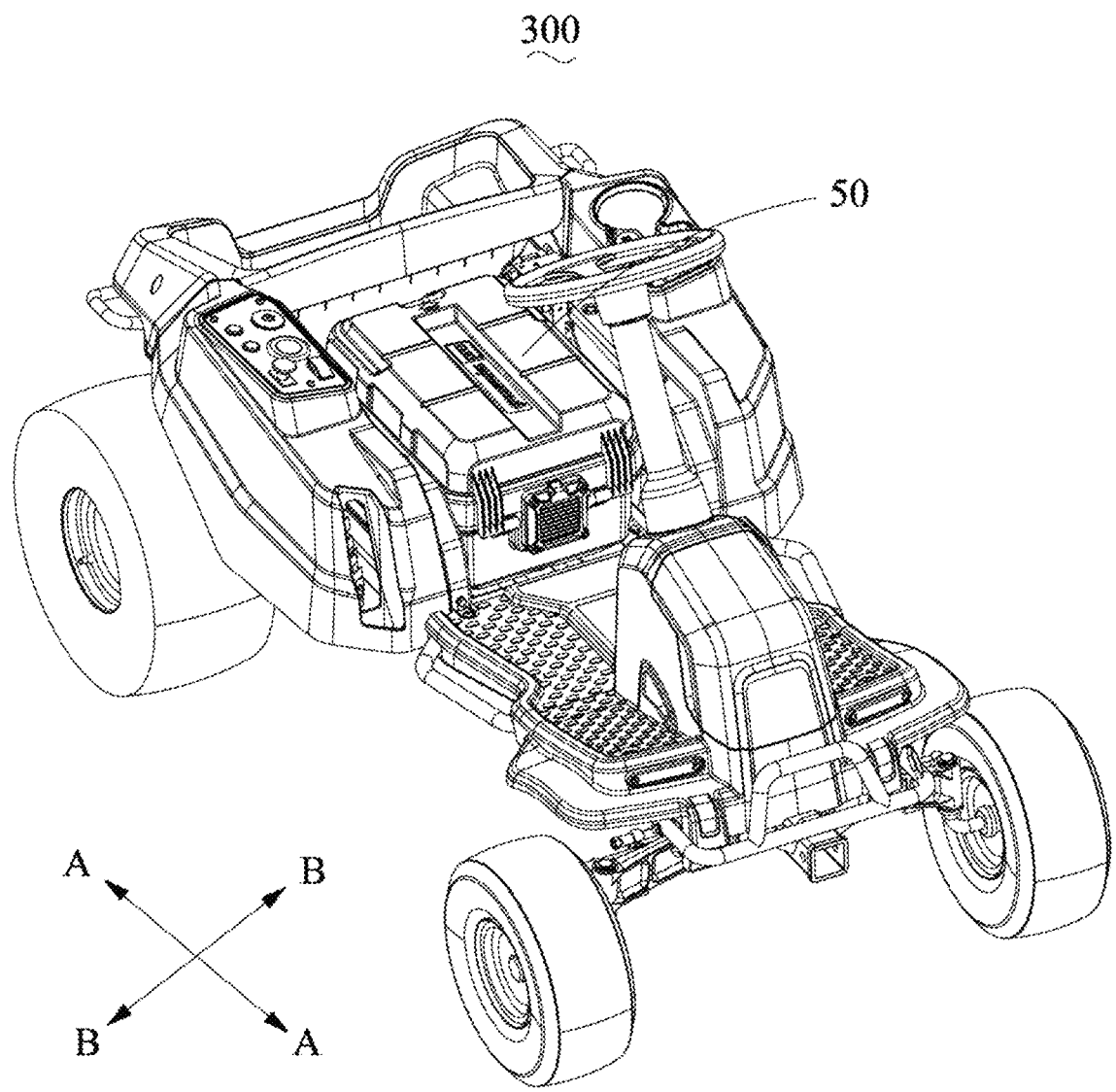
FIG. 11 is a perspective schematic view of an electric vehicle according to a third embodiment of the disclosure.
Figure 12:
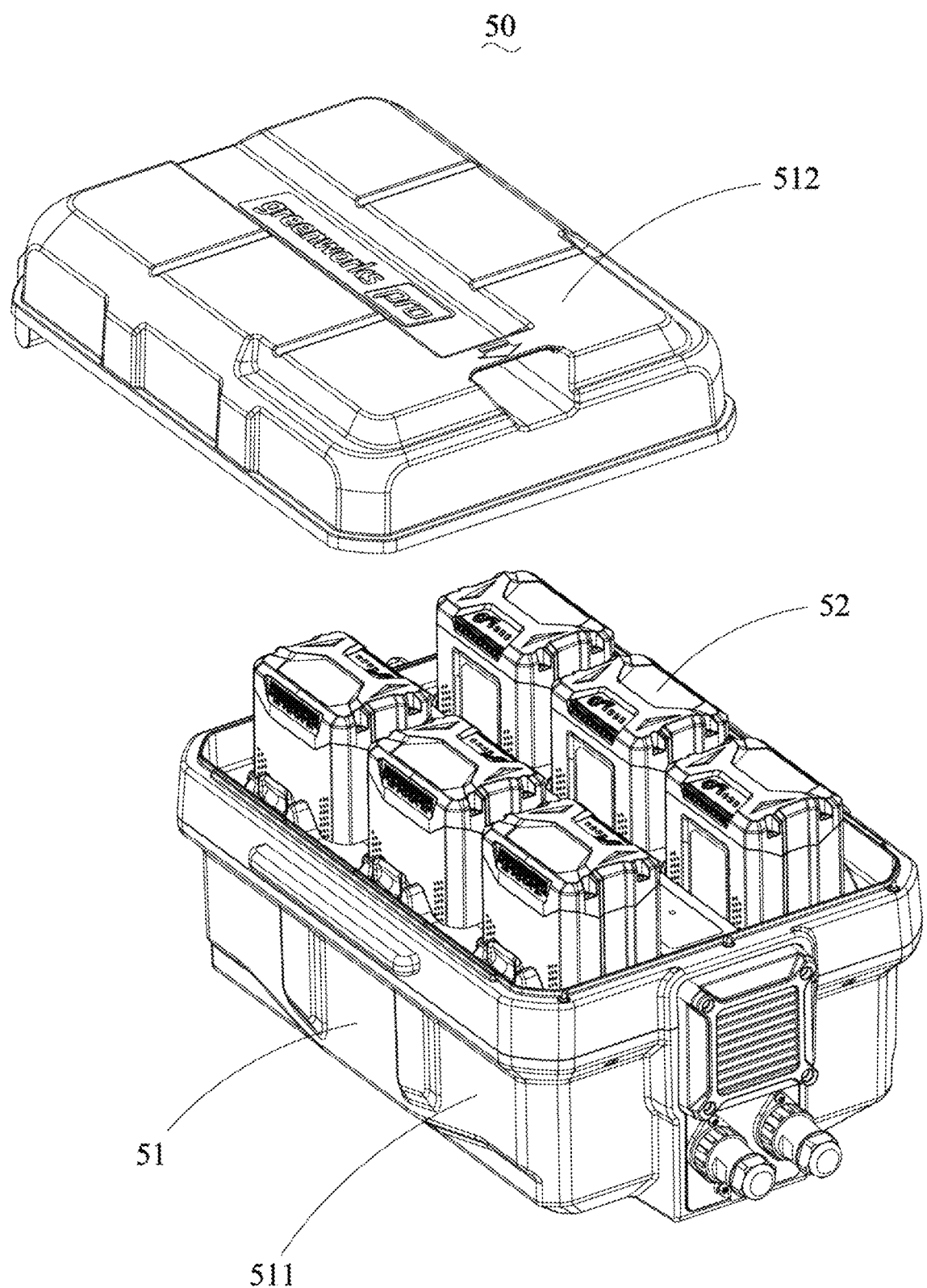
FIG. 12 is a perspective schematic view of a charger of the third embodiment.
Figure 13:
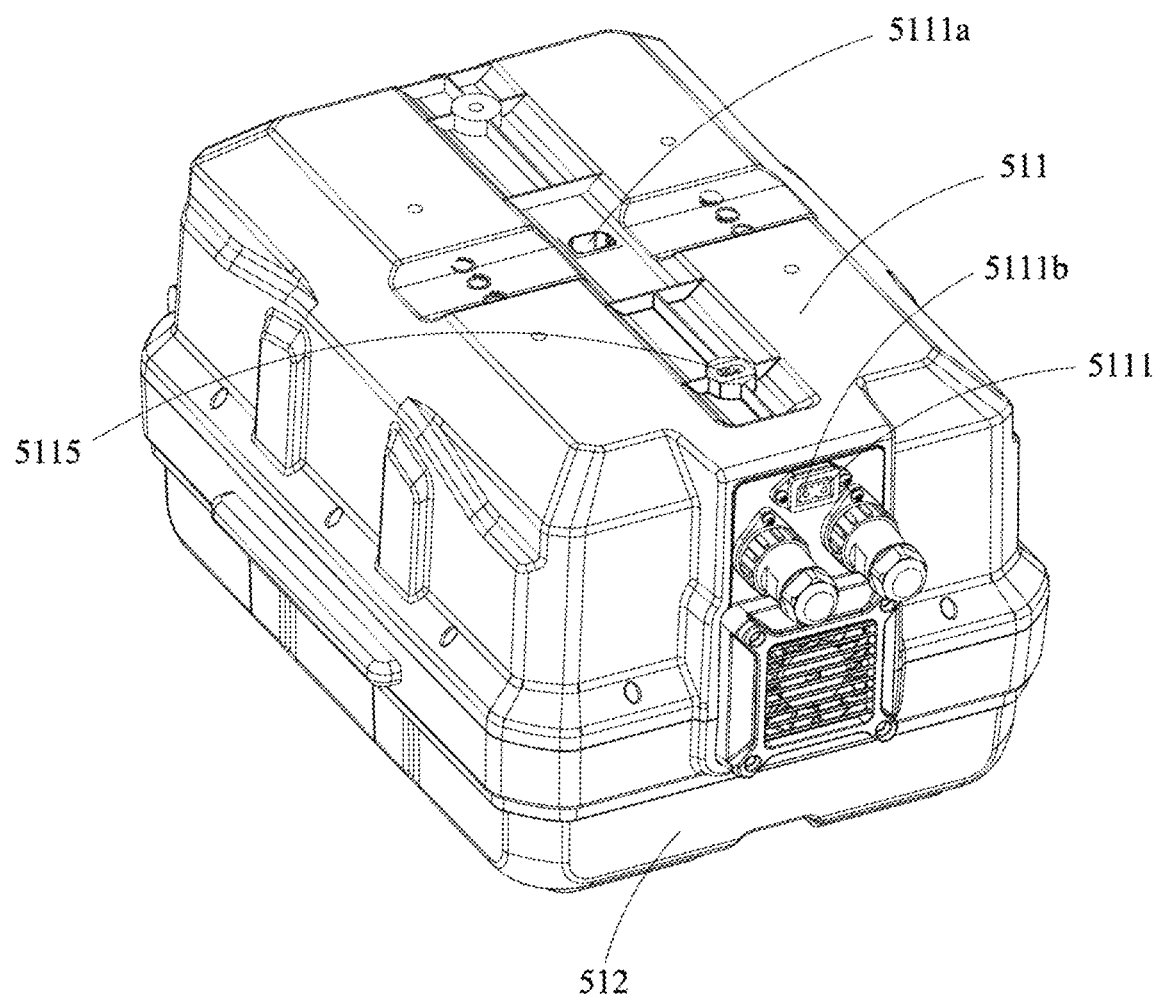
FIG. 13 is a perspective schematic view of the charger shown in FIG. 12 from another angle.
Figure 14:
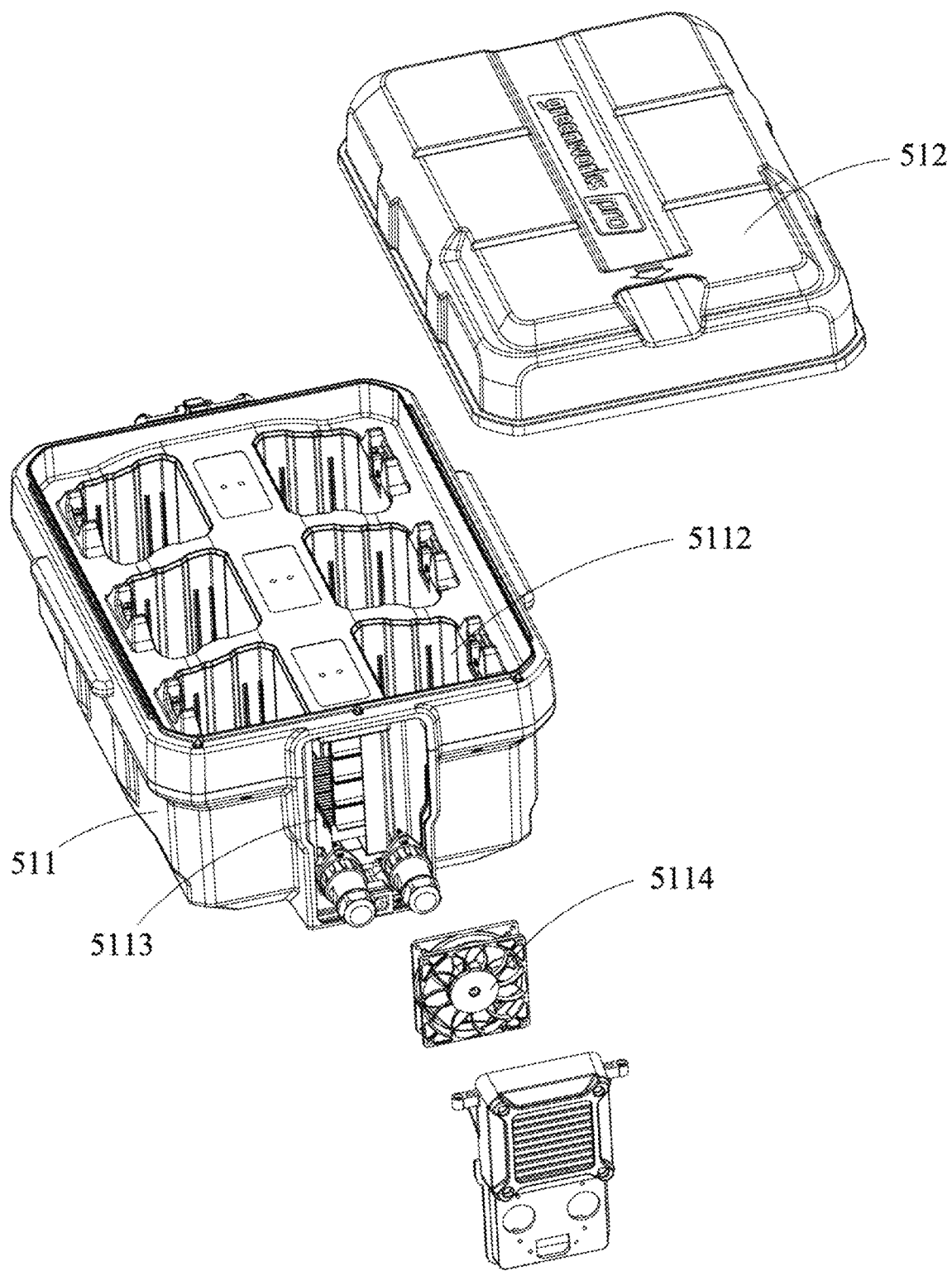
FIG. 14 is an exploded perspective view of the charger shown in FIG. 12.

FIG. 11 shows an electric vehicle 300 according to a third embodiment of the disclosure. The structure of the electric vehicle 300 is basically the same as the structure of the electric vehicle 100, including the walking mechanism 10, the vehicle body 20, the work apparatus, and the driving mechanism. The difference between the electric vehicle 300 and the electric vehicle 100 is: the power supply device 50 of the electric vehicle 300 is different from the power supply device 30 of the electric vehicle 100. Please refer to FIG. 12, FIG. 13 and FIG. 14, the power supply device 50 is detachably mounted in the receiving cavity 211 and matches with the power input port 216 to supply power to the electric vehicle 300. The power supply device 50 includes a charger 51 and a battery pack 52 matched with the charger 51. The charger 51 includes a base 511, a top cover 512 matched with the base 511, an inverter unit (not shown), and a control unit (not shown). The inverter unit and the control unit are housed in the base 511. The base 511 is provided with a power interface 5111, one or more charging portions 5112, an air-duct 5113, a ventilation fan 5114, and an output part. The power interface 5111 is located on a side wall of the base 511 for obtaining external power. The charging portion 5112 is arranged in the base 511, and is provided with a docking interface (not shown) to be connected with the battery pack 52, which is used to obtain the power of the battery pack 52 or charge the battery pack 52. In this embodiment, the number of the charging portions 5112 is six, and the charging portions are arranged along the forward direction AA of the electric vehicle 300. In addition, in the direction BB perpendicular to the forward direction of the electric vehicle 300, the number of the charging portions 5112 is not more than two. The charging portions 5111 are located on both sides of the air-duct 5113, and the air-duct 5113 is arranged along the forward direction AA of the electric vehicle 300 and penetrates the base 511. The ventilation fan 5114 is located in the air-duct 5113, and drives the airflow to flow into one end of the air-duct 5113 and flow out from the other end, so as to dissipate heat for the battery pack 52, the inverter unit and the control unit in the charging portion 5112. The output part is arranged at the bottom of the base 511 and includes a first power output interface 5115 and a second power output interface (not shown). The first power output interface 5115 is used to connect with the power input port 216 to supply power to the electric vehicle 200. The inverter unit is used for inverting the power obtained by the docking interface from the battery pack 52 into alternating current, and outputting the alternating current through the second power output interface. As another embodiment, the output part can also be provided with a direct current output interface (not shown) to output direct current. The direct current output interface includes one or more of a USB 2.0 interface, a USB 3.0 interface, a Micro USB interface, and a Type-C interface. An output voltage of the direct current output interface can be 5V, 20V, etc., which is not limited in the disclosure.

Preferably, the power interface 5111 further includes a first power interface 5111a and a second power interface 5111b. The first power interface 5111a is provided at the bottom of the base 511 to be connected with the power output port 217, so as to facilitate obtaining external power through the charging port 215 of the vehicle body 20. The second power interface 5111b is arranged on the side wall of the base 511.

Since there are multiple battery packs in the power supply device 40 and the power supply device 50. Preferably, the control unit obtains information of power of the battery packs, determines discharge priority level of each battery pack according to level of the power, and then controls the battery pack with a highest discharge priority level to discharge. When power difference between a currently working battery pack and a battery pack corresponding to a next discharge priority level is within a first preset threshold, the control unit controls the battery pack of the next discharge priority level to discharge together with the currently working battery pack. The first preset threshold can be set by the user or the manufacturer as required.

When the power supply device 40 and the power supply device 50 are in a charging state, the control unit obtains information of power of the battery pack, determines charging priority level of each battery pack according to the level of power, and then controls a battery pack with a highest charging priority level to charge. For example, if the power of the battery pack A is lower than the power of the battery pack B, the charging priority level of the battery pack A is higher than the charging priority level of the battery pack B. When power difference between a currently working battery pack and a battery pack corresponding to a next charging priority level is within a second preset threshold, the control unit controls the battery pack of the next charging priority level to charge together with the currently working battery pack. The second preset threshold can be set by the user or the manufacturer as required.

The above embodiments are only used to illustrate the technical solution of the disclosure and not to limit it. Although the disclosure is described in detail with reference to the preferred embodiments, those of ordinary skill in the art should understand that the technical solution of the disclosure can be modified or replaced without departing from the spirit and scope of the technical solution of the disclosure.

What is claimed is:

1. An electric vehicle, comprising:
a vehicle body, provided with a power input port; and
a power supply device, detachably mounted on the vehicle body, the power supply device supplying power for the electric vehicle and comprising a charger and a battery pack capable of detachably inserting into the charger, wherein the charger comprises:
a power interface, used to obtain external power, a charging portion, provided with a docking interface to connect with the battery pack, an output part, used to output power to the outside, the output part comprising a first power output interface connected with the power input port to supply power to the electric vehicle, and a control unit, wherein when the power interface is connected with external power, the control unit controls the charging portion to charge the battery pack;

wherein the charger further comprises a base, the base is provided with one or more charging portions and a ventilation fan, and the ventilation fan drives airflow to dissipate heat for the charger; and the base is further provided with an air-duct, the air-duct is arranged along a forward direction of the electric vehicle, the one or more charging portions are arranged on both sides of the air-duct, and the ventilation fan is located in the air-duct and drives the airflow to flow into one end of the air-duct and flow out from the other end.

2. The electric vehicle according to claim 1, wherein the charger is further provided with an inverter unit, the inverter unit is used to invert the power obtained by the docking interface from the battery pack into alternating current.

3. The electric vehicle according to claim 1, wherein the battery pack is detachably connected to a power tool.

4. The electric vehicle according to claim 1, wherein the vehicle body is provided with a charging port to obtain external power and a power output port electrically connected with the charging port, and when the power supply device is installed on the vehicle body, the power output port is connected with the power interface, at this time, the charger obtains external power through the charging port of the vehicle body and charges the battery pack.

5. The electric vehicle according to claim 4, wherein the power interface comprises a first power interface matched with the power output port and a second power interface to connect with an external power source, the first power interface is arranged on a bottom wall of the charger, and the second power interface is arranged on a side wall of the charger.

6. The electric vehicle according to claim 2, wherein the charger further comprises a base to house the inverter unit and the control unit.

7. The electric vehicle according to claim 6, wherein the base is located on one side of the charging portion and perpendicular to the charging portion; the charger is further provided with a ventilation fan housed in the base, and a ventilation hole arranged on a side wall of the base and matched with the ventilation fan; and the ventilation fan is located at an end of the base away from the charging portion.

8. The electric vehicle according to claim 6, wherein the base is located on one side of the charging portion and perpendicular to the charging portion, the number of the charging portion is 1, the electric vehicle comprises one or more power supply devices, the one or more power supply devices are arranged along a forward direction of the electric vehicle; and in a direction perpendicular to the forward direction of the electric vehicle, the number of the power supply devices is not more than two.

9. The electric vehicle according to claim 6, wherein the charger further comprises a supporting part mounted on the base, the base is provided with one or more charging portions; and the charging portions are arranged around the supporting part; and the inverter unit and the control unit are housed in the base.

10. The electric vehicle according to claim 9, wherein the support part is provided with a first heat dissipation unit for heat dissipation of the battery pack inserted into the charger.

11. The electric vehicle according to claim 10, wherein the supporting part comprises a first wall facing the battery pack and a second wall located between adjacent charging portions, the first wall is provided with a first vent, and the second wall is provided with a second vent corresponding to the first vent; and the first heat dissipation unit drives airflow to flow into one of the first vent and the second vent, and flow out from the other one; and a second heat dissipation unit for heat dissipation of the inverter unit and the control unit is provided in the base, the base is further provided with an air inlet and an air outlet corresponding to the air inlet, and the second heat dissipation unit drives the airflow to flow into the air inlet and out from the air outlet, so as to dissipate heat for the inverter unit and the control unit.

12. The electric vehicle according to claim 11, wherein the base is further provided with heat sinks for auxiliary heat dissipation for the inverter unit and the control unit, and an airflow direction of the air inlet and the air outlet is parallel to the heat sinks.

13. The electric vehicle according to claim 9, wherein the number of the charging portions is two, the two charging portions are respectively located on both sides of the supporting part to allow the two charging portions and the supporting parts to be collinear in a first direction, the electric vehicle comprises one or more power supply devices, the one or more power supply devices are arranged along a forward direction of the electric vehicle, wherein, the first direction is parallel to the forward direction of the electric vehicle; and in a direction perpendicular to the forward direction of the electric vehicle, the number of the power supply devices is not more than two.

14. The electric vehicle according to claim 9, wherein the number of the charging portions is two, the two charging portions are respectively located on both sides of the supporting part to allow the two charging portions and the supporting parts to be collinear in a first direction, the electric vehicle comprises one or more power supply devices, the one or more power supply devices are arranged along a forward direction of the electric vehicle, wherein, the first direction is perpendicular to the forward direction of the electric vehicle; and, in the first direction, the number of the power supply device is one.

15. The electric vehicle according to claim 1, further comprising a walking mechanism, wherein the walking mechanism comprises front wheels and rear wheels, and a center/center of gravity of the power supply device or a power supply device group comprising a plurality of the power supply devices is located between the front wheels and the rear wheels, and a distance between the center/center of gravity and an axis of the rear wheels is less than 490 mm.

16. The electric vehicle according to claim 1, further comprising a walking mechanism, wherein the walking mechanism comprises a pair of rear wheels, in a forward direction of the electric vehicle, the pair of rear wheels are symmetrical about a first axis, and a horizontal distance between a center/center of gravity of the power supply device or a power supply device group comprising a plurality of the power supply devices and the first axis is not greater than 500 mm.

17. The electric vehicle according to claim 1, wherein a weight ratio of the power supply device or the power supply device group comprising a plurality of the power supply devices to the electric vehicle without the power supply device or without the power supply device group is not greater than 0.5.

18. The electric vehicle according to claim 17, wherein the weight ratio of the power supply device or the power supply device group comprising the plurality of the power supply devices to the electric vehicle without the power supply device or without the power supply device group is not more than ⅓.

19. The electric vehicle according to claim 1, further comprising a walking mechanism, wherein the walking mechanism comprises front wheels and rear wheels, and a distance between a center of gravity of the electric vehicle with the power supply device and an axis of the rear wheels is not greater than 500 mm.

* * * * *